(12) United States Patent
Lowery

(10) Patent No.: US 6,765,310 B1
(45) Date of Patent: Jul. 20, 2004

(54) PROGRAMMED VIRTUAL MULTI-POLE OR MULTI-THROW SWITCH FOR OUTDOOR POWER EQUIPMENT AND METHOD

(75) Inventor: Michael V. Lowery, Brandon, MS (US)

(73) Assignee: Multicraft International, Jackson, MS (US)

( * ) Notice: Subject to any disclaimer, the term of this patent is extended or adjusted under 35 U.S.C. 154(b) by 269 days.

(21) Appl. No.: 09/849,308

(22) Filed: May 7, 2001

(51) Int. Cl.$^7$ ................................................ H02J 1/00
(52) U.S. Cl. ..................................... 307/9.1; 307/112
(58) Field of Search ............................. 307/9.1, 10.1, 307/112; 340/461

(56) References Cited

U.S. PATENT DOCUMENTS

| | | |
|---|---|---|
| 4,466,040 A | 8/1984 | Barthel et al. |
| 4,725,764 A | 2/1988 | Prestel |
| 4,792,783 A * | 12/1988 | Burgess et al. ............ 307/10.1 |
| 4,835,409 A | 5/1989 | Bhagwat et al. |
| 5,188,069 A | 2/1993 | Fiorenza, II |
| 5,394,678 A | 3/1995 | Lonn et al. |
| 5,519,878 A | 5/1996 | Dolin, Jr. |
| 5,657,224 A | 8/1997 | Lonn et al. |
| 5,711,391 A | 1/1998 | Brandt et al. |
| 5,848,668 A | 12/1998 | Kafrissen et al. |
| 6,130,607 A | 10/2000 | McClanahan et al. |
| 6,135,230 A | 10/2000 | Schenck et al. |
| 6,170,241 B1 | 1/2001 | Shibilski et al. |
| 6,186,260 B1 | 2/2001 | Schenck et al. |

* cited by examiner

Primary Examiner—Gregory J. Toatley, Jr.
(74) Attorney, Agent, or Firm—Blank Rome LLP

(57) ABSTRACT

The electrical system of an engine-powered outdoor machine is made more flexible in design with a virtual multi-pole switch comprising a microprocessor coupled to power-controlled devices of the electrical system, a single-pole switch coupled to an input of the microprocessor, and a program of the microprocessor simulating one or more interconnected multi-pole switches embodied in hardware and the wiring harness.

5 Claims, 2 Drawing Sheets

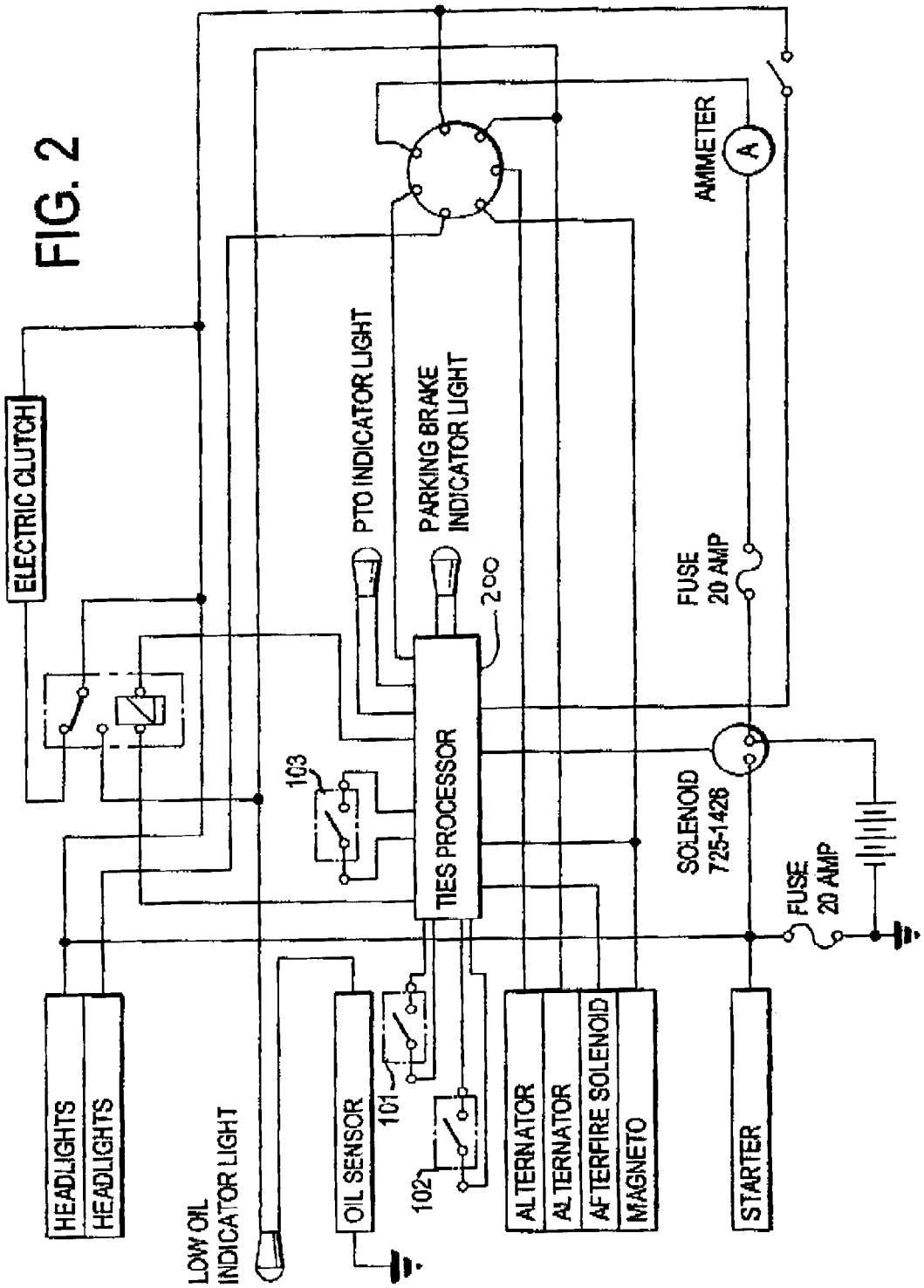

PROGRAMMED VIRTUAL MULTI-POLE OR MULTI-THROW SWITCH FOR OUTDOOR POWER EQUIPMENT AND METHOD

BACKGROUND OF THE INVENTION

1. Field of the Invention

The present invention relates to electrical systems for outdoor power equipment, and more particularly, to an interactive or integrated electrical switch system and method for outdoor power equipment.

2. Description of the Prior Art

Microprocessor circuits have largely replaced hard-wired logic circuits in many applications because of their greater flexibility and lower cost. However, in the field of outdoor power equipment, those of skill in the art have not fully utilized the advantages of microprocessors and continue to utilize multiple-pole ("multi-pole") or multiple-throw ("multi-throw") switches in electrical systems for outdoor power equipment.

One example of this is the continued use of multi-pole and multi-throw switches in the electrical systems of lawn mowers, tractors, and other outdoor equipment. In FIG. 1 of this specification, labeled "Prior Art," there is illustrated one example of a known electrical system for an outdoor power machine that uses a three-pole PTO (power take-off) switch, a two-pole seat switch, and a two-pole brake switch. All of those switches are interconnected via a wiring harness to effect the desired interactions and overall system function.

Since each multi-pole or multi-throw switch in an electrical system generally performs a function independently of other switches, a system using this prior art approach will require many different switches. The prior art approach also complicates assembly and stocking and increases cost. Of course, multi-pole switches are not only less reliable than simple single-pole switches, they are also much more expensive. The use of single-pole switches throughout the electrical system of an outdoor machine, and especially the use of a single design of single-pole switch, advantageously leads to reduced cost, greater reliability, and easier repair.

Another example prior art electrical systems for motors used in outdoor power equipment electrical systems is disclosed in U.S. Pat. No. 6,170,241 issued to Shibilski et al. This patent discloses two multi-pole switches 14 and 16 in a microprocessor circuit in a lawnmower.

U.S. Pat. Nos. 6,135,230 and 6,186,200 issued to Schenck et al. disclose an electrical system for a skid steer loader incorporating a microprocessor and multi-pole switches, the interaction of which is embodied in hard-wired logic. Schenck et al. teach that arm rest and seat switches are wired or coupled in series such that the switch signals inputted to the electronic controller are tied together in a particular manner, that is, using hard-wired logic. In all of their drawing figures, Schenck et al. disclose a double-throw armrest switch coupled to the seat switch.

U.S. Pat. No. 5,188,069 to Fiorenza, II, discloses single-pole switches coupled to respective pins of a microprocessor in an electrical system for a riding lawnmower. The objective of the Fiorenza invention is to defeat safety-switch tampering. The three switches are a seat switch closed when the operator is sitting on the seat, a transmission switch closed when the transmission is in neutral, and a power take off (PTO) switch closed when the power take off is disengaged.

The microprocessor of the Fiorenza apparatus remembers the history of each safety switch, and will not allow the lawnmower to run unless each switch has been closed after being open. This defeats tampering with the switches by shorting across them or taping them in the closed position; such a switch will not have been open, it will only have been closed. For his memory, Fiorenza discloses logic gates and flip-flops. The AND gates are needed because of the flip-flops, but without those memory devices, a simple series connection of the three switches would be adequate. Fiorenza does not disclose any multi-pole switches in the equivalent hard-wired circuit of his drawings. Moreover, the Fiorenza microprocessor does not operate in "real time".

In view of the limitations of the prior art devices as discussed above, it would be desirable in outdoor power equipment to replace hard-wired circuits with processors, and more particularly to specifically and systematically eliminate any switches other than single-pole, single-throw switches.

SUMMARY OF THE INVENTION

In view of the aforementioned deficiencies in the prior art, the present invention is directed to the use, in an outdoor power machine, of single-pole switches coupled directly to a microprocessor programmed to incorporate the logic of the interconnections between the poles of the multi-pole or multi-throw switches. More particularly, the invention contemplates systematically replacing all multi-pole and/or multi-throw switches with single-pole, single-throw switches.

The present invention further contemplates replacing each multi-pole or multi-throw switch with a virtual multi-pole or multi-throw switch. Such a virtual multi-pole or multi-throw switch might include a microprocessor coupled to the power-controlled devices of the electrical system, a single-pole, single-throw switch coupled to an input of the microprocessor, and a program in the microprocessor simulating multi-pole or multi-throw switches interconnected among the other parts of the electrical system or among themselves. As used herein, the term "virtual multi-pole or multi-throw switch" refers to the use of the combination of a single-pole switch coupled to a processor.

In a microprocessor-based electrical system, any interactions between various components can be programmed, and therefore the logic embodied in the interconnections between the extra poles of multi-pole switches, which are coupled to different components, can be embodied in a microprocessor coupled to single-pole switches and the same components.

The invention has several objects, namely:

(1) to achieve greater design flexibility and simplify redesigns of electrical systems for outdoor power machines;

(2) to decrease costs by replacing expensive multi-pole switches with inexpensive single-pole switches in the electrical systems for outdoor power machines;

(3) to increase reliability by using simpler and more rugged single-pole switches; and (4) to reduce a number of different parts to be stocked, assembled, and replaced, to one single part, a single-pole switch of a single design.

With these and other objects, advantages and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

FIG. 2 is a schematic view of the present invention disclosing an electrical system for outdoor power machines that is functionally equivalent to that of FIG. 1 but which incorporates a microprocessor and single-pole switches.

DETAILED DESCRIPTION OF THE INVENTION

Figure 1:
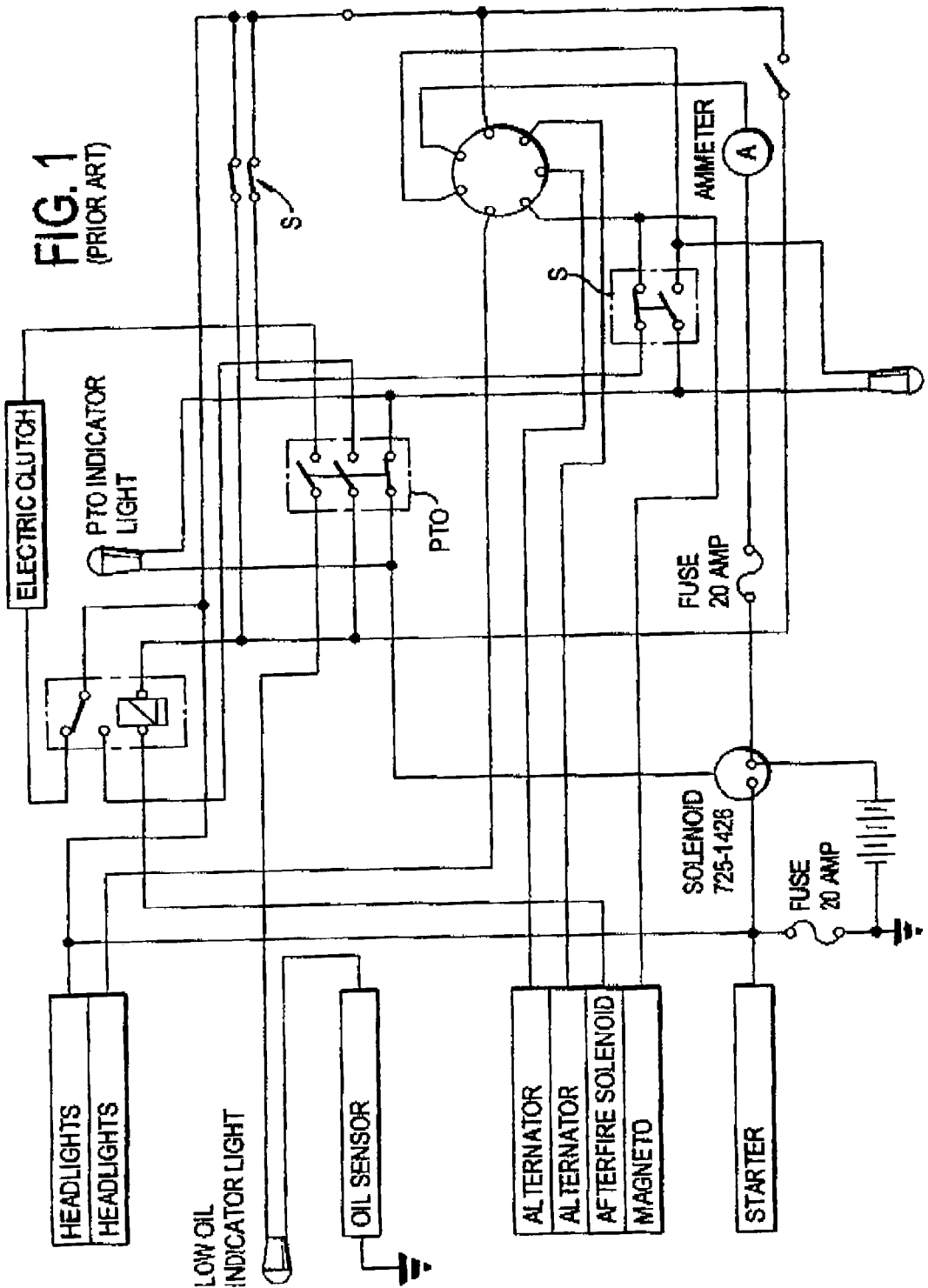
FIG. 1, labeled "Prior Art," is a schematic view of a known hard-wired electrical system with various multi-pole switches.

FIG. 1, discussed above and labeled "Prior Art," shows an electrical system for a tractor. There are three switches with multiple poles: a three-pole PTO switch, a two-pole seat switch S, and a two-pole brake switch B. All of those switches are interconnected via a wiring harness to embody the desired interactions and overall system functions. For example, the PTO switch is a three-pole switch that functions as three ganged single-pole switches, and is connected in three different circuits. The interactions of the three poles are hard-wired.

FIG. 2 shows the present invention with only single-pole switches 101, 102, and 103, respectively, for the seat, brake, and power take off. Each of the three switches is coupled directly to a microprocessor 200. The microprocessor 200 is programmed, by methods well known in the art, to incorporate the switch interactions which previously were embodies in the hard-wired harness. By using single-pole switches 101, 102, and 103 in place of multi-pole switches, the present invention reduces the amount of wiring in the harness and allows the interactions of the various electrical components to be readily and easily modified.

Assume, for example, that one multi-pole, single-throw switch is coupled to enable the starter, turn on the running lights, and power the engine ignition. To make any change in the function (e.g., to have the switch enable the starter and power the ignition but sound an alarm instead of turning on the running lights, or just to eliminate turning on the running lights) will require a new wiring harness, and usually a new switch with a greater or fewer number of poles.

According to the present invention, any combination of functions can be programmed from one single-pole, single-throw switch, that is less expensive and more reliable, by either replacing or, preferably, reprogramming the control chip of the microprocessor. The total length of wiring is substantially reduced because every component is coupled directly to the central processor and such wiring need not run from one component to another.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. In an engine-powered outdoor machine having an electrical system with power-controlled devices, the improvement wherein the electrical system comprises at least one virtual multi-pole or multi-throw switch, further comprising:

a microprocessor coupled to the power-controlled devices of the electrical system;

a single-pole, single-throw switch coupled to an input of the microprocessor; and a program of the microprocessor simulating interconnected multi-pole or multi-throw switches.

2. The machine according to claim 1, wherein the improvement comprises the program being operable in real time.

3. The machine according to claim 1, wherein the improvement comprises a plurality of single-pole, single-throw switches.

4. The machine according to claim 3, wherein the single-pole, single-throw switches comprise seat, brake and power take off switches.

5. A method of improving an electrical system for an engine-powered outdoor machine having one or more multi-pole switches coupled to power-controlled devices of the electrical system, the method comprising the steps of:

replacing the one or more multi-pole switches with a microprocessor coupled to the power-controlled devices of the electrical system and at least one single-pole switch coupled to an input of the microprocessor; and programming the microprocessor to operate the single-pole switch and simulate the one or more multi-pole switches.

* * * * *